United States Patent
McClure et al.

(10) Patent No.: US 7,163,620 B2
(45) Date of Patent: Jan. 16, 2007

(54) RETRO FILTER BAG

(75) Inventors: James McClure, Solana Beach, CA (US); Angelo Vito Pugliese, Jr., Vista, CA (US)

(73) Assignee: Dimension One Spas, Vista, CA (US)

( * ) Notice: Subject to any disclaimer, the term of this patent is extended or adjusted under 35 U.S.C. 154(b) by 0 days.

(21) Appl. No.: 10/677,126

(22) Filed: Sep. 30, 2003

(65) Prior Publication Data

US 2005/0067339 A1    Mar. 31, 2005

(51) Int. Cl.
E04H 4/12 (2006.01)
B01D 29/54 (2006.01)
B01D 29/58 (2006.01)

(52) U.S. Cl. ............... 210/167.19; 210/238; 210/315; 210/416.2; 210/484

(58) Field of Classification Search .............. 210/169, 210/232, 238, 314, 315, 416.1, 416.2, 484, 210/485
See application file for complete search history.

(56) References Cited

U.S. PATENT DOCUMENTS

| | | | | |
|---|---|---|---|---|
| 1,725,618 A * | 8/1929 | Chappelle | .................. | 210/330 |
| 2,384,057 A * | 9/1945 | Wetherell | .................. | 210/489 |
| 2,792,118 A * | 5/1957 | Kraissl, Jr. | .................. | 210/238 |
| 2,946,449 A * | 7/1960 | Shaw | .......................... | 210/484 |
| 2,946,450 A * | 7/1960 | Shaw | .......................... | 210/484 |
| 3,173,865 A * | 3/1965 | Bosico | ...................... | 210/169 |
| 3,347,386 A * | 10/1967 | Karissl, Jr. | .................. | 210/238 |
| 3,954,621 A * | 5/1976 | Etani et al. | ................. | 210/314 |
| 4,419,232 A * | 12/1983 | Arntyr et al. | ............... | 210/164 |
| 5,672,271 A * | 9/1997 | Dye | .......................... | 210/169 |
| 5,830,350 A * | 11/1998 | Voss et al. | .................. | 210/169 |
| 6,007,714 A * | 12/1999 | Keith | ......................... | 210/169 |
| 6,395,167 B1 * | 5/2002 | Mattson et al. | ............. | 210/169 |
| 6,572,765 B1 * | 6/2003 | Lincke | ...................... | 210/169 |
| 6,716,342 B1 * | 4/2004 | Tilsner | ...................... | 210/169 |
| 2004/0055939 A1 * | 3/2004 | Wybo | .......................... | 210/169 |

\* cited by examiner

*Primary Examiner*—Fred G. Prince
(74) *Attorney, Agent, or Firm*—Fish & Richardson P.C.

(57) ABSTRACT

Systems and methods to filter water. A filtration device for a floodable compartment having a water inlet and a water outlet can include a removable filter for being positioned at or near the water outlet of the compartment, a strainer having a first end and a second end, wherein the first end is configured to at least partially surround the filter near the water outlet, and wherein the second end is configured to contact the compartment at least partially around the filter at a point in the compartment between the water inlet and the water outlet. The filtration device can be implemented as a water filtration system for a pool or spa, where the water inlet can be from the pool or spa, and the water outlet can be to a pump.

15 Claims, 2 Drawing Sheets

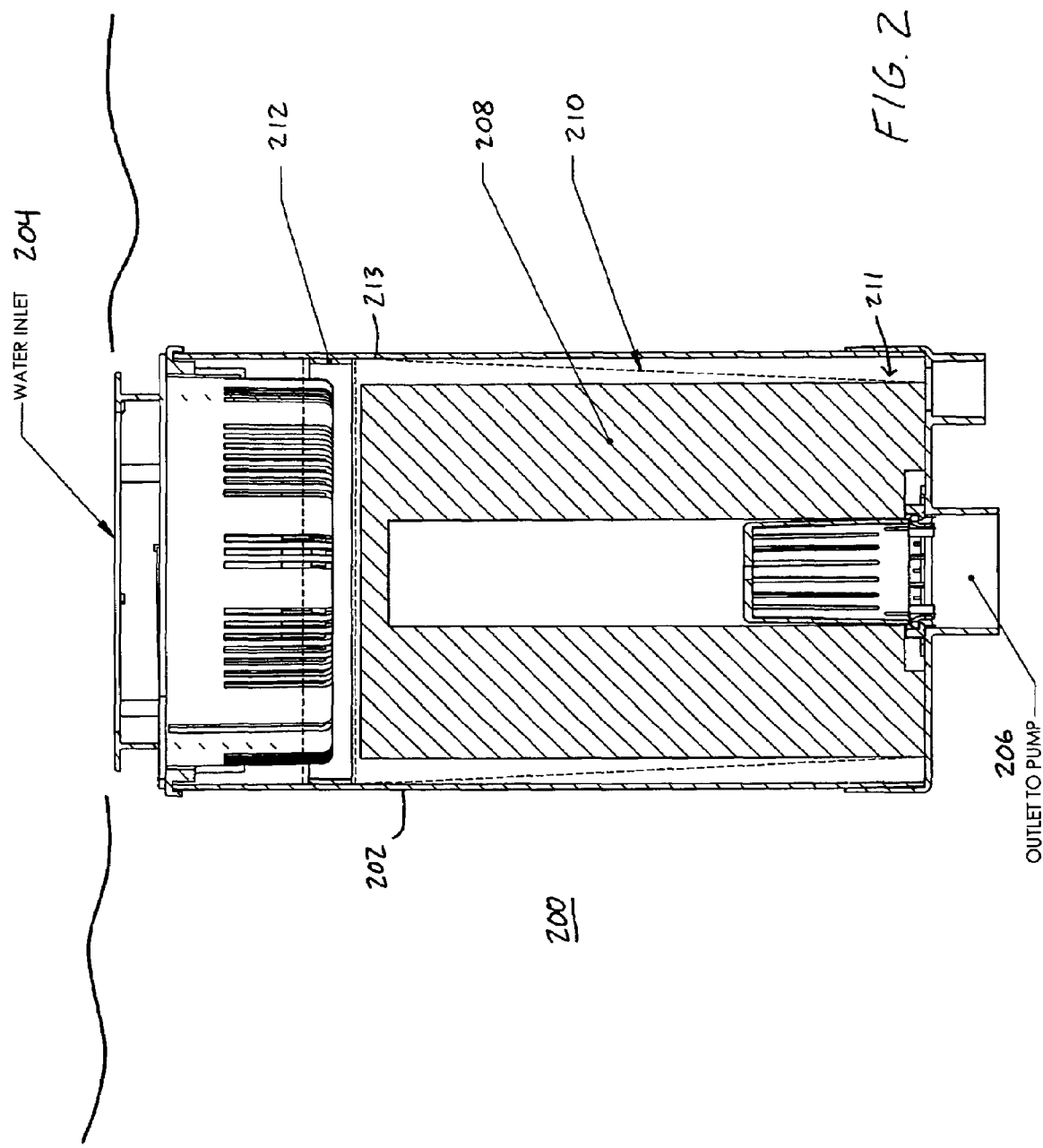

RETRO FILTER BAG

BACKGROUND

The following description relates to water filtration systems for pools or spas.

Water filters, such as suction cartridge filters often used in pools or spas, may operate in a flooded compartment. The compartment includes at least one water inlet from the main body of water of the pool or spa, and at least one water outlet leading to a suction intake of a pump that can generate a continual flow of water through the compartment. The outlets are typically at the bottom of the chamber. Cartridge filters, for example, are placed over the water outlet to capture particulate matter from the flowing water such as dust, dirt, sand, and other small particulates.

When such filters are removed from the compartment for cleaning or replacement, some larger particles or floating particles not captured by the filter can remain in the compartment. Examples of these particles include grass, insects, leaves, hair, etc. These particles are difficult to remove from the compartment even when the filter has been removed, and usually remain in the flooded compartment. If the pump is operated, a danger exists that some of these particles may get into the intake portion of the pump and potentially damage or block the pump.

In-line screens and stand pipes have been used in the past to counter the problem of particles that remain in a filter compartment upon removal of the filter from the compartment. However, these devices do not address the removal of the particles from the compartment—they only block access to the pump intake. One negative consequence of these devices is that they can trap particles, and thereby restrict water flow to the pump. Further, in-line screens must be maintained, which also could expose the pump to these types of particles.

SUMMARY

The present disclosure includes systems and techniques relating to water filtration. According to an aspect, a filtration device for a floodable compartment having a water inlet and a water outlet can include a removable filter for being positioned at or near the water outlet of the compartment, a strainer having a first end and a second end, wherein the first end is configured to at least partially surround the filter near the water outlet, and wherein the second end is configured to contact the compartment at least partially around the filter at a point in the compartment between the water inlet and the water outlet. The strainer can include a porous bag.

The strainer can include a contact mechanism at the strainer second end for contacting the compartment, and the contact mechanism can include an expansion ring. The strainer first end can be configured to contact the filter at or near the water outlet. The strainer can include a holding mechanism coupled at the strainer second end, and the holding mechanism cam include a handle or a strap. The filtration device can be implemented as a water filtration system for a pool or spa, where the water inlet can be from the pool or spa, and the water outlet can be to a pump.

According to another aspect, a method of filtering water flowing through a compartment from a water inlet to a water outlet can involve placing a removable filter at or near the water outlet, at least partially surrounding the filter with a first end of a strainer at or near the water outlet, and contacting the compartment with a second end of the strainer at a point in the compartment between the water inlet and the water outlet. The method can further involve straining the water of particles that are not captured by the filter. Straining the water can involve removing the filter from the compartment, and removing the strainer from the compartment. Moreover, the filter and the strainer can be removed from the compartment simultaneously.

Details of one or more implementations are set forth in the accompanying drawings and the description below. Other features and advantages may be apparent from the description and drawings, and from the claims.

BRIEF DESCRIPTION OF THE DRAWINGS

FIG. 2 shows an embodiment of a filtration device.

DETAILED DESCRIPTION

Figure 1:
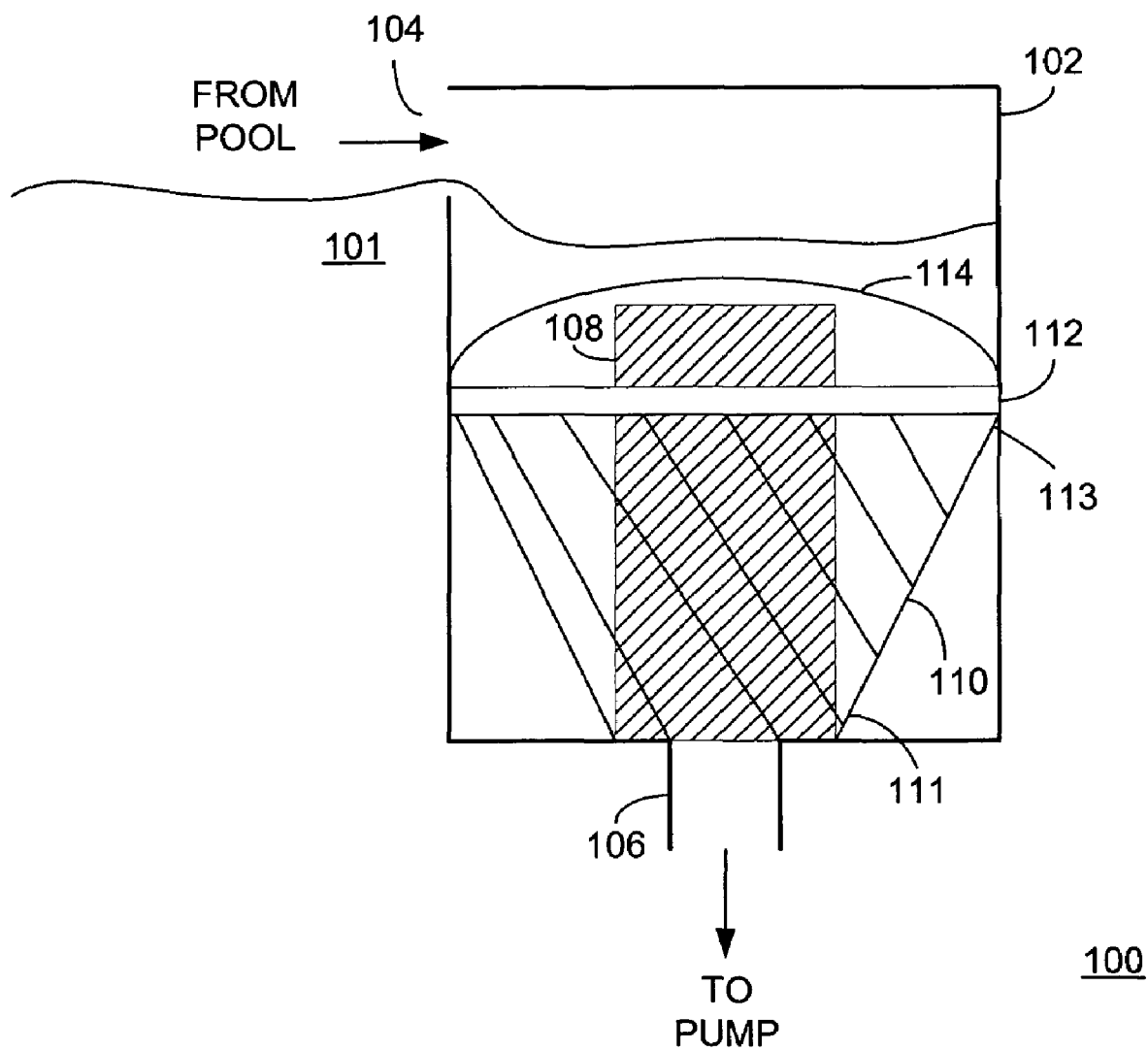
FIG. 1 is a block diagram of a water filtration system.

FIG. 1 shows a water filtration system 100. The water filtration system includes a compartment 102 having a water inlet 104 and a water outlet 106. The water inlet 104 receives a flow of water 101 from a pool, spa, bath, or the like. The water outlet 106 supplies water to the pool or spa plumbing based on suctioning action of a pump. A continual flow of water in from water inlet 104 and out of the water outlet 106 allows for the compartment 102 to be at least partially flooded at times.

The system 100 further includes a removable filter 108 that can be positioned at or near the water outlet 106, preferably in the path of the direction of water flow, for removing particulate matter from the water. The filter 108 may be a filter cartridge having a rigid housing around a water-permeable or semi-permeable filtering material such as paper, fabric, metal screen, or other porous materials used to remove particulates from the water. The filter 108 can be positioned within and removed from the compartment 102 by way of an opening or hatch (not shown) in the compartment, or through the water inlet 104.

The system 100 also includes a strainer 110. The strainer includes a first end 111 that at least partially surrounds and contacts a base of the filter 108 at or near the water outlet 106. The strainer 110 also includes a second end 113 that contacts the compartment 102 at a point between the water inlet 104 and the water outlet 106, preferably at a spaced distance from the filter 108. The strainer 110 can be made of a porous non-rigid material in the form of a bag or the like, or may be made of other porous materials that can be rigid or semi-rigid. In a particular example, the strainer 110 is a bag-like structure into which the filter 108 can be placed. The bottom of the bag-like structure can be placed with the filter 108 at or near the water outlet 106, and the top of the bag-like structure surrounds the filter 108 contacts the compartment 102 at a level between the water inlet 104 and the water outlet 106. The strainer 110 may be more water-permeable than the filter 108, is adapted to strain or filter particles from the water that are not captured by or embedded in the filter 108. These particles can remain suspended in the water in the compartment 102, particularly when the filter 108 is removed.

The strainer 110 can include a contact mechanism 112 that provides the contact to the compartment 102. The contact mechanism 112 may include an expansion ring, a rigid edge, or the like. The strainer 110 can also include a holding mechanism 114 that allows for the strainer 110 to be lifted out of the compartment 102. The holding mechanism 114 may include a handle, a strap, or other similar mechanism. The strainer 110 can be connected with the filter 108 at the strainer first end 111. The strainer first end 111 can be closed in order to surround at least the base of the filter 102.

In operation, the strainer 110 is disposed around the filter 108, i.e. the filter 108 may be positioned in the strainer 110, or the strainer 110 may be placed around the filter 108. During operation of the filtration system 100, water flows into the space between the strainer second end 113 and the filter 108, and then through the filter 108. When the filter 108 needs to be removed from the compartment (such as for cleaning or the like), either the filter 108 can be disconnected from the compartment and removed with the strainer 110 as a single unit. Water in the compartment between the filter 108 and the strainer 110 is "strained," thereby trapping loose particles from the water that have not been captured by the filter 108. The filter 108 is preferably easily separated from the strainer 110, whether removable from the compartment 102 as a single unit or separately.

FIG. 2 shows an embodiment of a filtration device 200 within a compartment 202. The compartment 202 includes a water inlet 204 and a water outlet 206. The filtration device 200 includes a filter 208 disposed at or near the water outlet 206. In one example, the filter 208 includes an attachment mechanism to attach to the water outlet 206. The filtration device 200 further includes a strainer 210 having a first end 211 and a second end 213. The first end 211 can surround the base of the filter 208 at or near the water outlet 206. Other techniques may be used to contact or connect the first end 211 of the strainer 210 to the base of the filter 208. The second end 213 is spaced from the filter 208 and contacts a sidewall of the compartment 202, at a point between the water inlet 204 and the water outlet 206. The strainer 210 may include a contact mechanism 212 such as an expansion ring or the like, for contacting the strainer second end 213 to the compartment 202.

In one example, the filter 208 is a cylindrical cartridge filter, and the strainer 210 is a bag-like structure in which the first end 211 is a bottom of the bag-like structure, and the second end 213 is sized to circumscribe an interior wall of the compartment 202. Those having ordinary skill in the art, however, would recognize that the filter 208 may be any shape or size, and the strainer 210 may also be of any shape or size to accommodate the compartment 202 and filter 208.

Although a few embodiments have been described in detail above, other modifications are possible. For example, the figures show an arrangement in which the water outlet is at the bottom of the compartment. However, the water outlet, as well as the placement of the filter and the strainer, may be provided anywhere in the compartment such as on the side or even top. Other embodiments may be within the scope of the following claims.

The invention claimed is:

1. A filtration system for a floodable compartment having an interior wall between a water inlet and a water outlet, the filtration system comprising:
a filter adapted to be positioned at or near the water outlet to block filtered particles in water entering the floodable compartment via the water inlet from reaching the water outlet, the filtered particles comprising captured particles and uncaptured particles;
a strainer that surrounds the filter and comprising a first end to contact the filter and a second end to contact the interior wall of the floodable compartment to allow the water entering the floodable compartment from the water inlet to pass between the filter and the strainer before interacting with the filter, the strainer adapted to capture at least some of the uncaptured particles when the filter is removed from the water outlet; and
wherein the filter and the strainer are configured to allow all of water passing through the filter to also pass through the strainer.

2. A filtration system in accordance with claim 1, wherein the strainer and removable filter are removable from the floodable compartment as a single unit.

3. A filtration system in accordance with claim 1, wherein the strainer includes a bag.

4. A filtration system in accordance with claim 1, wherein the strainer includes a holding mechanism coupled at the second end.

5. A filtration system in accordance with claim 4, wherein the holding mechanism includes a handle.

6. A filtration system in accordance with claim 1, wherein the second end of the strainer includes a contact mechanism to contact the interior wall of the compartment.

7. A filtration system in accordance with claim 6, wherein the contact mechanism includes an expansion ring.

8. A filtration system for a floodable compartment having an interior wall between a water inlet and a water outlet, the filtration system comprising:
a filter adapted to be positioned at or near the water outlet to block filtered particles in water entering the floodable compartment via the water inlet from reaching the water outlet, the filtered particles comprising captured particles and uncaptured particles; and
a strainer that surrounds the filter and comprising a first end to contact the filter and a second end to contact the interior wall of the floodable compartment to allow the water entering the floodable compartment from the water inlet to interact with the filter, the strainer adapted to capture at least some of the uncaptured particles when the filter is removed from the water outlet wherein the first end of the strainer contacts the filter at or near the water outlet.

9. In a filtering system having a filter adapted to be positioned at or near a water outlet of a floodable compartment to block filtered particles in water entering the floodable compartment via the water inlet from reaching the water outlet, the filtered particles comprising captured particles and uncaptured particles, a straining device comprising:
a strainer adapted to surround the filter and comprising a first end to contact the filter and a second end to contact an interior wall of the floodable compartment to allow the water entering the floodable compartment from the water inlet to pass between the filter and the strainer before interacting with the filter, the strainer further adapted to capture at least some of the uncaptured particles when the filter is removed from the water outlet, wherein the filter and the strainer are configured to allow all of the water passing through the filter to also pass through the strainer.

10. The straining device in accordance with claim 9, wherein the strainer further comprises a bag.

11. The straining device in accordance with claim 9, wherein the strainer further comprises an expansion ring connected to the second end.

12. The straining device in accordance with claim 9, wherein the strainer further comprises a holding mechanism.

13. The straining device in accordance with claim 12, wherein the holding mechanism includes a handle.

14. A filtration system for a floodable compartment having an interior wall between a water inlet and a water outlet, the filtration system comprising:

filtering means for blocking filtered particles in water entering the floodable compartment via the water inlet from reaching the water outlet, the filtered particles comprising captured particles and uncaptured particles;

straining means for allowing the water entering the floodable compartment from the water inlet to pass between the filter and the strainer before interacting with the filter, and for capturing at least some of the uncaptured particles when the filler is removed from the water outlet; and wherein the filtering means and the straining means are configured to allow all of the water passing through the filter to also pass through the strainer.

15. A filtration system in accordance with claim 14, wherein the straining means further includes a first end to contact the filtering means and a second end to contact an interior wall of the floodable compartment to allow the water entering the floodable compartment from the water inlet to interact with the filtering means.

* * * * *